United States Patent
Yu et al.

(10) Patent No.: US 10,628,826 B2
(45) Date of Patent: Apr. 21, 2020

(54) TRAINING AND SELECTION OF MULTIPLE FRAUD DETECTION MODELS

(71) Applicant: Vesta Corporation, Portland, OR (US)

(72) Inventors: Jiaqi Yu, Sherwood, OR (US);
Jianning Le, Lake Oswego, OR (US)

(73) Assignee: Vesta Corporation, Portland, OR (US)

(*) Notice: Subject to any disclaimer, the term of this patent is extended or adjusted under 35 U.S.C. 154(b) by 656 days.

(21) Appl. No.: 14/951,135

(22) Filed: Nov. 24, 2015

(65) Prior Publication Data

US 2017/0148027 A1   May 25, 2017

(51) Int. Cl.
    *G06Q 20/40* (2012.01)
    *G06Q 10/06* (2012.01)
    *G06Q 10/10* (2012.01)

(52) U.S. Cl.
    CPC ..... *G06Q 20/4016* (2013.01); *G06Q 10/0635* (2013.01); *G06Q 10/10* (2013.01); *G06Q 20/40* (2013.01)

(58) Field of Classification Search
    CPC .......... G06Q 20/4016; G06Q 10/0635; G06Q 10/10; G06Q 20/40
    USPC ..................................................... 705/35–40
    See application file for complete search history.

(56) References Cited

U.S. PATENT DOCUMENTS

| | | | |
|---|---|---|---|
| 5,819,226 A * | 10/1998 | Gopinathan | G06Q 20/00 705/44 |
| 7,428,509 B2 | 9/2008 | Klebanoff | |
| 7,793,835 B1 | 9/2010 | Coggeshall et al. | |

(Continued)

FOREIGN PATENT DOCUMENTS

| | | | |
|---|---|---|---|
| CA | 2766029 A1 * | 7/2012 | .......... G06Q 20/388 |
| EP | 2790146 | 10/2014 | |

(Continued)

OTHER PUBLICATIONS

Paasch; "Credit Card Fraud Detection Using Artificial Neural Networks Tuned by Genetic Algorithms", A Thesis Submitted to the Hong Kong University of Science and Technology, Doctor of Philosophy in Information and Systems Management, Hong Kong (Year: 2008).*

(Continued)

*Primary Examiner* — Edward J Baird
(74) *Attorney, Agent, or Firm* — Beyer Law Group LLP

(57) ABSTRACT

A payment processing system continuously processes transactions. Multiple modeling technologies are used within a fraud detection system to each handle different blocks of segmented transaction data in order to detect fraud. Model data is created from recent segmented transaction data that is currently handled by an existing model; each transaction includes a fraud flag as to whether it was fraudulent or not. The model data is used to train, validate and test any of a number of types of models where the fraud flag is the target. Performance metrics such as Sensitivity, Review Rate and False Positives are calculated for each trained model. An operational objective is used to determine a value for a particular performance metric which then dictates values for other performance metrics for each model. The best model is chosen by optimizing the performance metrics. The best model is configured and deployed to replace the existing model.

8 Claims, 9 Drawing Sheets

(56) References Cited

U.S. PATENT DOCUMENTS

| | | | |
|---|---|---|---|
| 8,417,715 B1* | 4/2013 | Bruckhaus | G06Q 10/04 707/758 |
| 8,600,881 B2 | 12/2013 | Nguyen | |
| 8,919,641 B2 | 12/2014 | Bishop et al. | |
| 9,740,991 B2 | 8/2017 | Seidman | |
| 9,892,465 B2 | 2/2018 | Love et al. | |
| 9,947,020 B2 | 4/2018 | Fordyce | |
| 9,996,825 B1 | 6/2018 | Casey | |
| 10,127,554 B2 | 11/2018 | Russell | |
| 10,289,633 B1* | 5/2019 | Reiner | G06F 16/283 |
| 10,298,444 B2* | 5/2019 | Bishnoi | H04L 41/069 |
| 2003/0006277 A1 | 1/2003 | Maskatiya | |
| 2007/0106582 A1* | 5/2007 | Baker | G06Q 10/067 705/35 |
| 2008/0015978 A1 | 1/2008 | Curry | |
| 2008/0027860 A1 | 1/2008 | Mullen | |
| 2008/0275748 A1 | 11/2008 | John | |
| 2009/0222243 A1* | 9/2009 | Zoldi | G06Q 10/04 703/2 |
| 2010/0057622 A1* | 3/2010 | Faith | G06Q 20/04 705/71 |
| 2010/0094767 A1 | 4/2010 | Miltonberger | |
| 2010/0280880 A1 | 11/2010 | Faith et al. | |
| 2011/0131122 A1 | 6/2011 | Griffin | |
| 2011/0173116 A1* | 7/2011 | Yan | G06Q 10/067 705/38 |
| 2011/0225158 A1 | 9/2011 | Snyder et al. | |
| 2011/0238510 A1 | 9/2011 | Rowen | |
| 2011/0238575 A1 | 9/2011 | Nightengale et al. | |
| 2011/0307381 A1 | 12/2011 | Kim | |
| 2011/0307382 A1 | 12/2011 | Siegel | |
| 2012/0030083 A1 | 2/2012 | Newman | |
| 2012/0036073 A1 | 2/2012 | Basu et al. | |
| 2012/0226613 A1 | 9/2012 | Adjaoute | |
| 2014/0156568 A1* | 6/2014 | Ganguly | G06Q 10/0637 706/12 |
| 2014/0230033 A1 | 8/2014 | Duncan | |
| 2014/0244503 A1 | 8/2014 | Sadlier | |
| 2014/0258118 A1 | 9/2014 | Scott | |
| 2014/0258162 A1 | 9/2014 | Maran | |
| 2014/0279494 A1* | 9/2014 | Wiesman | G06Q 20/3224 705/44 |
| 2014/0324699 A1* | 10/2014 | Ding | G06Q 20/4016 705/44 |
| 2014/0351129 A1 | 11/2014 | Finot et al. | |
| 2015/0026027 A1 | 1/2015 | Press et al. | |
| 2015/0026062 A1* | 1/2015 | Paulsen | G06Q 20/29 705/44 |
| 2015/0066739 A1 | 3/2015 | Luca Jr. | |
| 2015/0066797 A1 | 3/2015 | Outwater | |
| 2015/0095247 A1* | 4/2015 | Duan | G06Q 30/0185 705/318 |
| 2015/0170147 A1* | 6/2015 | Geckle | G06Q 20/4016 705/44 |
| 2015/0339673 A1 | 11/2015 | Adjaoute | |
| 2015/0379430 A1* | 12/2015 | Dirac | G06N 20/00 706/12 |
| 2016/0005029 A1 | 1/2016 | Ivey | |
| 2016/0057248 A1 | 2/2016 | Tankha | |
| 2016/0085810 A1* | 3/2016 | de Castro Alves | G06F 16/24568 707/752 |
| 2016/0171498 A1 | 6/2016 | Wang | |
| 2016/0283942 A1 | 9/2016 | Chitragar et al. | |
| 2016/0342963 A1* | 11/2016 | Zoldi | G06N 7/005 |
| 2017/0116674 A1 | 4/2017 | Howe | |
| 2017/0132866 A1 | 5/2017 | Kuklinski | |
| 2017/0148024 A1 | 5/2017 | Yu et al. | |
| 2017/0148025 A1 | 5/2017 | Le et al. | |
| 2017/0148026 A1 | 5/2017 | Lei et al. | |

FOREIGN PATENT DOCUMENTS

| | | | | |
|---|---|---|---|---|
| GB | 2532512 A | 5/1916 | | |
| GB | 2512070 A | 9/2014 | | |
| WO | WO-2007041709 A1 * | 4/2007 | | G06Q 20/10 |
| WO | 2009082369 A1 | 7/2009 | | |
| WO | WO-2012058066 A1 * | 5/2012 | | G06Q 40/02 |

OTHER PUBLICATIONS

International Search Report dated Jan. 24, 2017 from International Application No. PCT/US2016/062545.
Written Opinion dated Jan. 24, 2017 from International Application No. PCT/US2016/062545.
Office Action for U.S. Appl. No. 14/951,060, dated Jun. 15, 2018.
Office Action for U.S. Appl. No. 14/951,060, dated Sep. 28, 2018.
Office Action for U.S. Appl. No. 14/951,060, dated Jan. 11, 2019.
Office Action for U.S. Appl. No. 14/951,087, dated Mar. 21, 2018.
Office Action for U.S. Appl. No. 14/951,087, dated Sep. 25, 2018.
Office Action for U.S. Appl. No. 14/951,087, dated Dec. 20, 2018.
Office Action for U.S. Appl. No. 14/951,119, dated Apr. 20, 2018.
Office Action for U.S. Appl. No. 14/951,119, dated Oct. 9, 2018.
Office Action for U.S. Appl. No. 14/951,119, dated Feb. 7, 2019.
Final Office Action for U.S. Appl. No. 14/951,119, dated Aug. 21, 2019.
Final Office Action for U.S. Appl. No. 14/951,060, dated Aug. 6, 2019.
Final Office Action for U.S. Appl. No. 14/951,087, dated Jul. 1, 2019.
Gourieroux: "Infrequent Extreme Risks" CREST, CEPREMAP and University of Toronto, The Geneva Papers on Risk and Insurance Theory (2004).
Negahban: "Does Device Matter? Understanding How User, Device, and Usage Characteristics Influence Risky IT Behaviors of Individuals", University of North Texas, Aug. 2015 (Year: 2015).

* cited by examiner

Review Rate vs. Sensitivity For Model A

False Positives vs. Sensitivity for Model A

TRAINING AND SELECTION OF MULTIPLE FRAUD DETECTION MODELS

CROSS-REFERENCE TO RELATED APPLICATIONS

This application is related to U.S. patent application Ser. Nos. 14/951,060, 14/951,087, 14/951,119, filed on the same date herewith, which are hereby incorporated by reference.

FIELD OF THE INVENTION

The present invention relates generally to fraud detection in payment transactions using fraud detection models. More specifically, the present invention relates to training and selecting the best model or models based upon recent transaction data.

BACKGROUND OF THE INVENTION

In this digital age, merchants are challenged by customers who want near instantaneous transactions across multiple channels and the need to reduce fraudulent transactions. At the same time, merchants struggle to enhance fraud detection for the rapidly growing market of digital goods.

With the prevalence of computers, mobile telephones and the Internet, buyers and sellers can now interact without seeing one another; card-not-present (CNP) transactions in which the merchant never sees the payment card are now much more common. As e-commerce becomes more popular and digital sales and delivery more common, merchants struggle to contain fraudulent payments without inconveniencing customers. A glitch during an e-commerce transaction can result in loss of the transaction for the merchant.

Unfortunately, card-not-present transactions—many of which are performed using computers, a telephone or mobile devices—are responsible for a great deal of fraud. But, increasing fraud controls and tightening up fraud detection algorithms in order to detect fraud during a transaction can result in a good transaction being denied and a good customer being turned away. Most fraud detection systems are not yet able to handle the increase in online card-not-present transactions and especially the sale and delivery of digital goods.

One reason that prior art fraud detection systems have difficulty has to do with the modeling technology that is used. In particular, card-not-present fraud has very dynamic attack patterns. This creates a challenge for the payment processing industry to devise a single modeling technology that is effective for all fraud attack patterns over an extended period of time. The current industry practice is to select one modeling technology and then to train that model which is rarely changed in response to fraud attack patterns that do change over time. A single model may not be effective for different transaction channels when a fraud attack pattern changes. Currently, it is not practical to attempt to train a model or to change models when a fraud pattern changes.

Thus, further techniques and systems are desired to improve the ability of a fraud detection system to react quickly when fraud patterns change.

SUMMARY OF THE INVENTION

To achieve the foregoing, and in accordance with the purpose of the present invention, a fraud detection system is disclosed that can rapidly train any number of fraud detection models with multiple predictive modeling technologies and then automatically select a model that can best protect against a particular fraud pattern at the time. The present invention captures more fraud, generates fewer False Positives and improves the transaction rate.

It is realized that no single modeling technology can address all fraud patterns over time. Some fraud is addressed by using a simple rule, while other fraud is better addressed by using a complex model. The present invention tests a variety of models in an efficient manner in order to see which solves the problem at hand best in the current fraud environment. A framework is disclosed that automatically chooses the best model depending upon the fraud environment and computing resources available. The framework is fully automated and can train, fine tune and select a model or models on a daily or weekly basis.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As discussed above, a fraud detection system is useful in the prevention of fraud involving payment cards in the payment industry. In one embodiment, a fraud detection system using multiple modeling technologies is used within a global, online payment processing system such as that operated by Vesta Corporation of Portland, Oreg. The payment processing system is suitable for use with international card networks, local payment networks, and can process payments in numerous currencies.

Payment Processing System Overview

Figure 1:
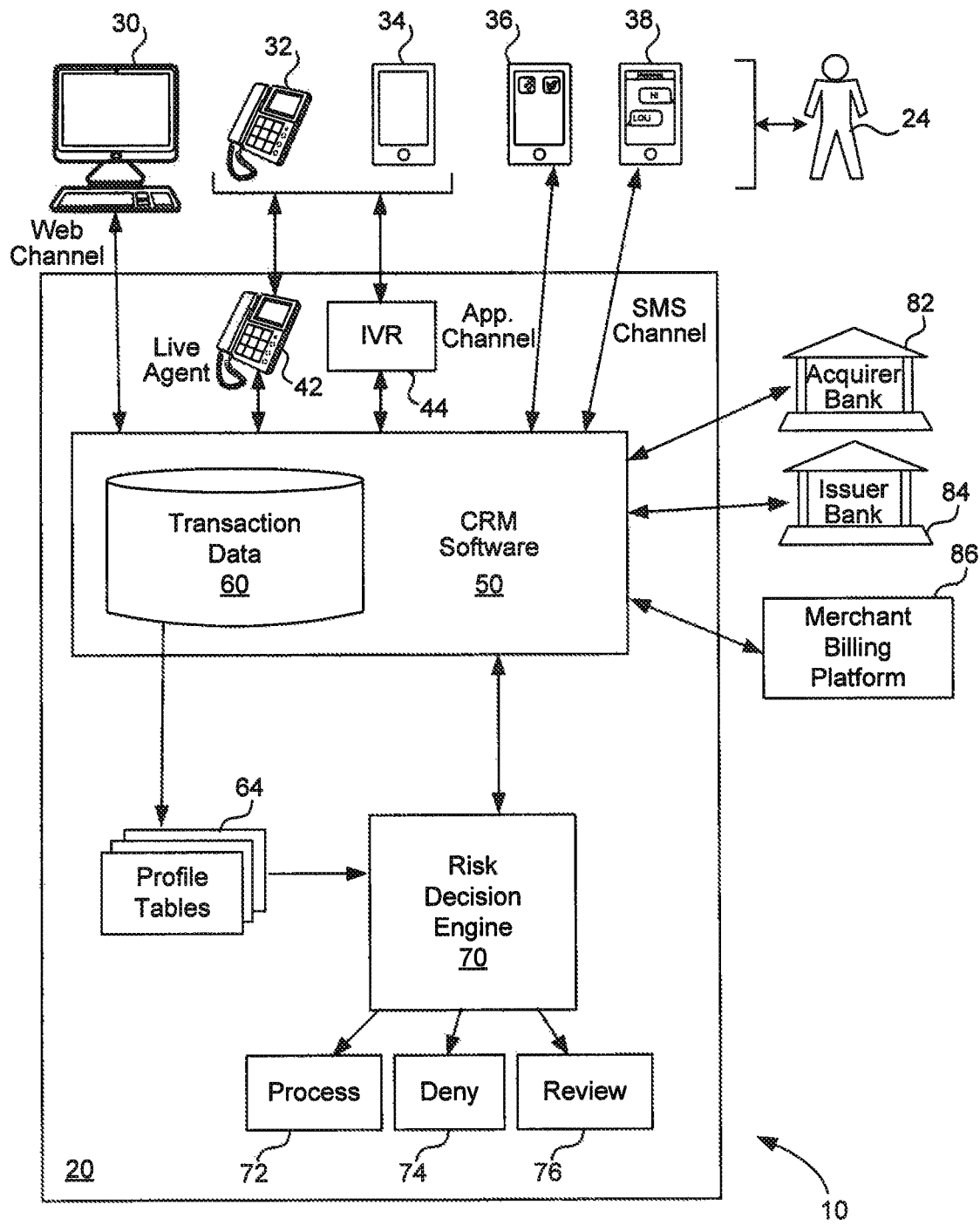
FIG. 1 is an example of a payment processing system that includes a fraud detection system.

FIG. 1 illustrates an exemplary payment processing system 10 according to one embodiment of the invention that includes an anomaly detection system. An individual 24 desires to process a transaction using a payment card and utilizes any of channels 30-38 that communicate with an enterprise processor 20 in order to determine whether or not to process the transaction. The transaction may be to provide payment for any type of physical goods, for digital goods, or for a service such as recharging a mobile telephone or device, topping up a mobile telephone, incrementing a prepaid account, bill payment, money transfer, digital download, electronic tickets, online games, online gambling, and so on. The digital goods may include airline tickets, event tickets, gift cards, virtual gift cards, reloading money onto a gift card, digital music, credit for games, etc. The payment card (not shown) that the individual desires to use may be a credit card, a charge card, a debit card or another physical card, or even a virtual card such as PayPal, crypto currency, eCheck and so on. In general, the transaction is a card-not-present (CNP) transaction because although the individual 24 is in possession of the card (or at least knows the card number, expiration date, etc.), the merchant is unable to see the card because the individual is remote and is using an electronic channel in order to complete the transaction.

The channels include a Web channel in which the individual typically uses a computer 30 (desktop, laptop, tablet, etc.) in order to submit a transaction to the processor 20, although the individual may also use a mobile telephone with a Web browser to submit a transaction. More traditionally, the individual may use a corded or cordless telephone 32, or a mobile telephone 34, in order to submit a transaction via a live agent channel 42, or via an interactive voice response (IVR) channel 44. An application on a mobile telephone 36 may also be used to submit a transaction via an "app" channel, and mobile telephone 38 may be used to submit a transaction via an SMS channel in which text messages (or similar) are used. A "text-to-pay" channel may also be used with mobile telephone 38. Although not shown, another possible channel is an automatic recurring top-up of a prepaid account of a mobile telephone (for example); such an automatic transaction may not necessarily be initiated by the individual, but may be generated from within processor 20.

As is known in the art, telephone 32 may use the Public Switched Telephone Network (PSTN), and wireless devices 34-38 may use a wireless network such as any digital or analog cellular network, a PCS network, a satellite network, a radio frequency network, or other similar wireless network to communicate with an enterprise 20. Computer 30 may use an Internet Service Provider to connect over the Internet to enterprise 20.

As one of skill in the art will appreciate, individuals around the world are using these channels and others to submit transactions that are forwarded to processor 20 around-the-clock, resulting in a constant order flow that is handled by customer relationship management (CRM) software 50. CRM software 50 is executing upon any suitable server computer or computers within an enterprise 20. The same computer (or others) may also be used by enterprise 20 to host the IVR system 44, the risk decision engine 70, or for other functions needed to implement the payment processing system.

As will be appreciated, the incoming order flow from these channels includes a variety of data that is not only specific to a particular transaction but also may be specific to the channel being used by the individual, and, certain data is collected and stored for each transaction. For each transaction, the CRM software stores into transaction data 60 a record of each transaction, typically storing data elements such as: payment card number (which may be encrypted), expiration date, name and address of the individual, geographical location where the individual is located, amount of the transaction, e-mail address, shipping name and address, IP address of the computing device being used, telephone number of the channel being used, device information of the computing device being used, Internet service provider (ISP) being used, device fingerprint and related device characteristics, social media network linkages, etc.

Continuously, or periodically, the information records in transaction data 60 are used to generate any number of profile tables 64. A profile table is basically a counter based upon a particular data element found within transaction data 60. For example, a profile table for a payment card number may indicate the number of transactions attempted per particular payment card the day before, during the last week, during the last three months, etc. A profile table for the data element bank identification number or BIN (the first six digits of the payment card number which identifies a bank) may indicate the number of transactions attempted per issuer in a particular time period. Or, a profile table for ZIP code indicates the number of attempted transactions originating from particular ZIP codes in a given time period. Because the order flow is constant, the profile tables are updated in real time as transactions are stored within transaction data 60.

As will be explained in greater detail below, risk decision engine 70 includes algorithms to process an incoming transaction, and using profile tables 64, makes a decision as to whether to process a transaction 72, to deny a transaction 74, or to submit a transaction for further manual review 76. The outputs 72, 74 or 76 from risk decision engine 70 may take the form of computer instructions given to CRM software 50, may be output onto a display of a computer screen, may be printed, maybe output via a speaker, etc. The outputs may also be used as input into another algorithm for further analysis or may be fed back into the decision engine in order to directly alter the behavior of the on-line production system related to fraud.

Accordingly, the risk decision engine may direct the CRM software 50 to communicate with the acquirer bank 82, communicate with the issuer bank 84 and communicate with the merchant billing platform 86 (such as for a telecommunications carrier) about whether or not to recharge a particular telephone, whether to reload money onto a virtual gift card, whether or not to ship the physical or digital goods that the individual wishes to purchase, etc. For example, if the decision engine 70 decides to process 72 a transaction, then an authorization is requested from the issuer bank (typically via the acquirer bank), the merchant 86 is directed to deliver the goods or services to the individual, and eventually the issuer bank settles with the acquirer bank. If the decision engine decides to deny 74 a transaction, then no payment settlement is sent, and the merchant is informed that the transaction is denied (and no goods or services will be delivered).

Overview

As is known, a variety of machine learning technologies (including nonlinear systems) may be used to implement a fraud detection model in the detection of card-not-present fraud. These models include: a regression model, a neural net, a decision tree, a rule-based model, a random forest model and a support vector machine model. And, as has been mentioned, prior art fraud detection systems select and train a single model for use in fraud detection and rarely change that model in response to changing fraud patterns. The present invention allows various models to be trained rapidly and then selects the best model or models based upon the current fraud environment.

Figure 2:
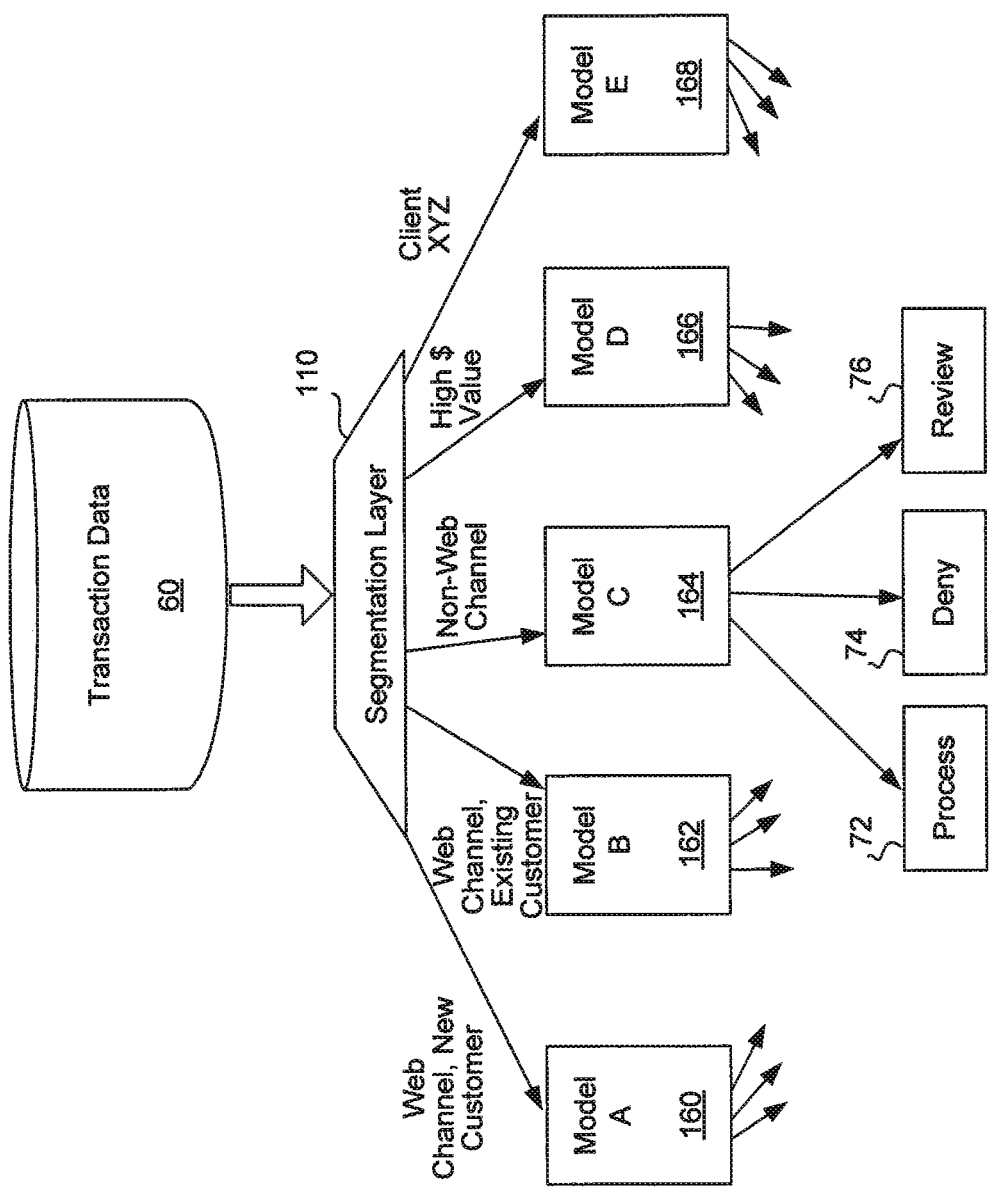
FIG. 2 illustrates in more detail the processing of transactions occurring within the risk decision engine.

FIG. 2 illustrates in more detail the processing of transactions occurring within the risk decision engine 70. As mentioned, transactions arrive continuously and are fed from transaction data 60 into a segmentation layer 110. Within this layer, transactions are segmented into blocks using a variety of transaction characteristics, typically based upon demographic criteria, and each block may be routed to a different model that can best address fraud in that block. Also, because processor 20 may be handling transactions for a number of clients, it may be desirable to segment the transaction data into blocks in order that each block is processed using a particular modeling technology that may be requested by the client. As shown in this simple example, the transaction data is segmented into five different blocks, and each block is sent to one of the models A-E 160-168.

By way of example, a first client has its transactions handled by one of four different modeling technologies 160-166. Accordingly, all transactions on behalf of this client which arrived via a Web channel and involve a new customer are handled by model A; model B handles all Web channel transactions for this client that involve an existing customer. All transactions that do not arrive via a Web channel are handled by model C, and all transactions involving a high dollar amount are handled by model D. A particular client XYZ has required that all its transactions be handled by a particular model E. In general, different models may be used by the same client for different channels and based upon other criteria such as: whether the payment device is new or existing, whether the full address is available or only a postal code was captured, etc. A particular client may request that its transaction data be segmented into numerous blocks using a variety of transaction criteria.

Each model, for example, model C, also outputs a result of each transaction processed, such as a process decision 72, a deny decision 74 or a review decision 76 as described above. As the arrows below each of the other models indicate, each of these other models will also output one of these decisions for each transaction processed.

Although any number of models may be used, it is found that about twelve different models work well and that there may be any number of different clients for whom processor 20 handles transactions. Because there may be many clients, each of which may segment its transaction data into numerous blocks, it can be difficult to manually train each model on a daily or weekly basis as the fraud environment changes. The present invention provides a system and technique by which a model or models can be trained and selected on a daily, weekly or on-demand basis for use with each of the segmented blocks.

Figure 3:
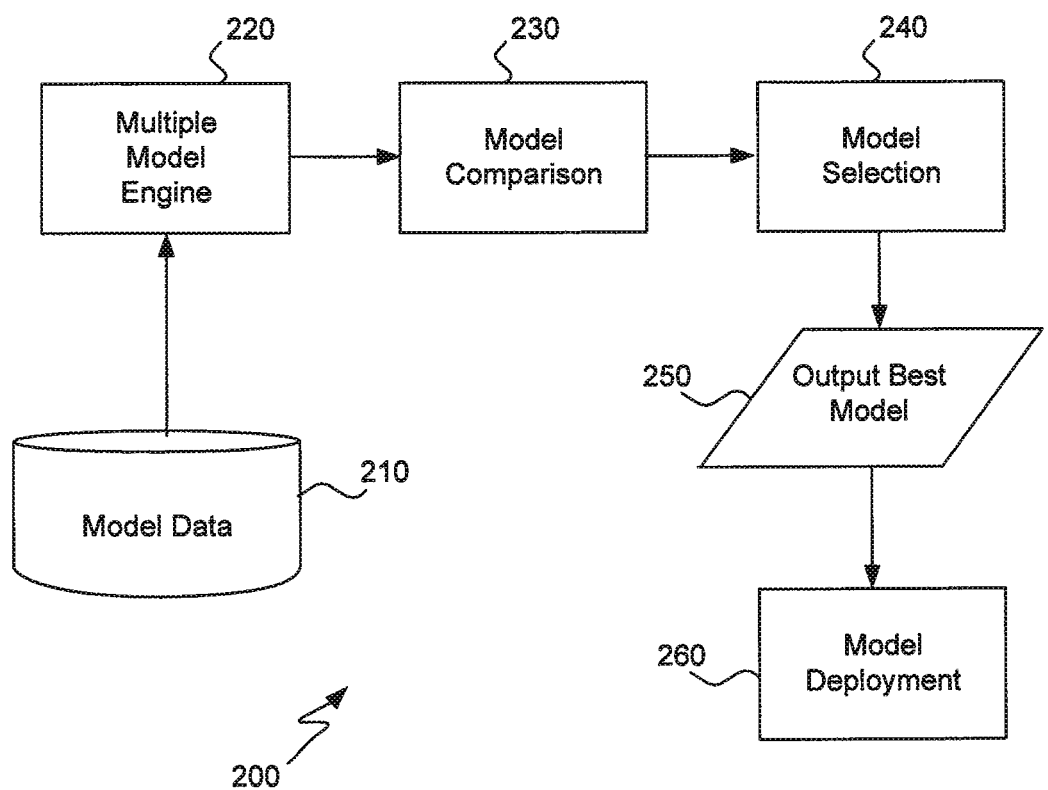
FIG. 3 is a block diagram of a model training and selection system used to implement an embodiment of the present invention.

FIG. 3 is a block diagram of a model training and selection system used to implement an embodiment of the present invention. Model data 210 includes, for each transaction, not only the raw transaction data from each order, but also any number of predictive variables for each order. In one embodiment, approximately 2,000 predictive variables and their values have been calculated and are included with each transaction. These include variables known in the art such as whether the dollar amount of the transaction is in a particular range, how long a customer has been known to the processor, how many orders have been completed by particular payment device in the last thirty days, etc. The model data may be stored in a suitable database within processor 20 such as database 60 on a production server, or within a separate server used for model training and selection. Advantageously, the multiple model engine 220 automatically retrieves this model data periodically; it is not required that an individual manually retrieve the model data and perform training.

Thus, each historical transaction in the model data includes not only the raw transaction data but also numerous predictive variables and a binary flag indicating whether or not the transaction was fraudulent (the "fraud" variable). As is known in the art, a fraudulent transaction may be reported by the cardholder sometime after the transaction occurs, may be reported by the cardholder's bank, may be indicated by a chargeback, and may be discovered in other ways. The binary flag may be set for a transaction in the database at any suitable time.

The multiple model engine 220 is responsible for training multiple models (either in parallel or serially) using the model data. As is known, the training of a model attempts to find a relationship between the transaction data (raw data and the predictive variables and their values) and the value of the binary fraud flag. In other words, a model learns what is it about the transaction data that determines whether a transaction will be fraudulent or not. Advantageously, the present invention is able to automatically and rapidly train multiple models and can then compare and select the most appropriate model for the particular fraud environment at the time.

Model comparison occurs in module 230, model selection occurs in module 240, and the best model is output in block 250. In block 260 the best model is deployed within the production system (such as within the payment processing system shown in FIGS. 1 and 2) as will be described in more detail below.

Detailed Flow Diagrams

Figure 4A:
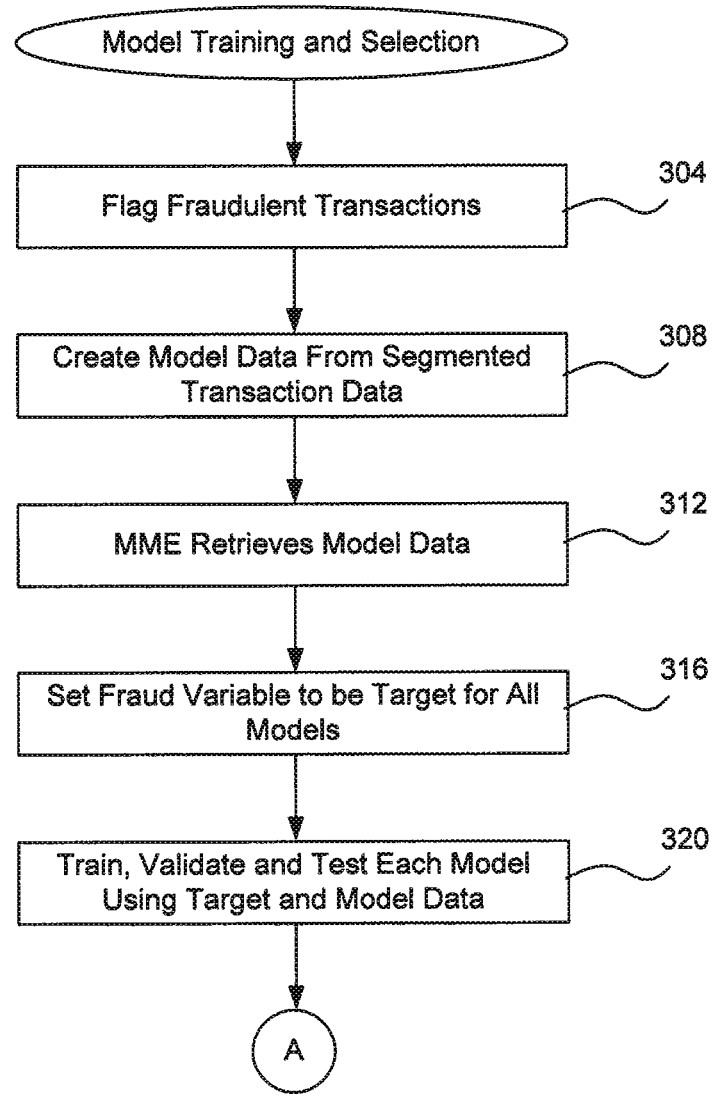
FIGS. 4A and 4B are a flow diagram describing automatic model training and selection according to one embodiment.
Figure 4B:
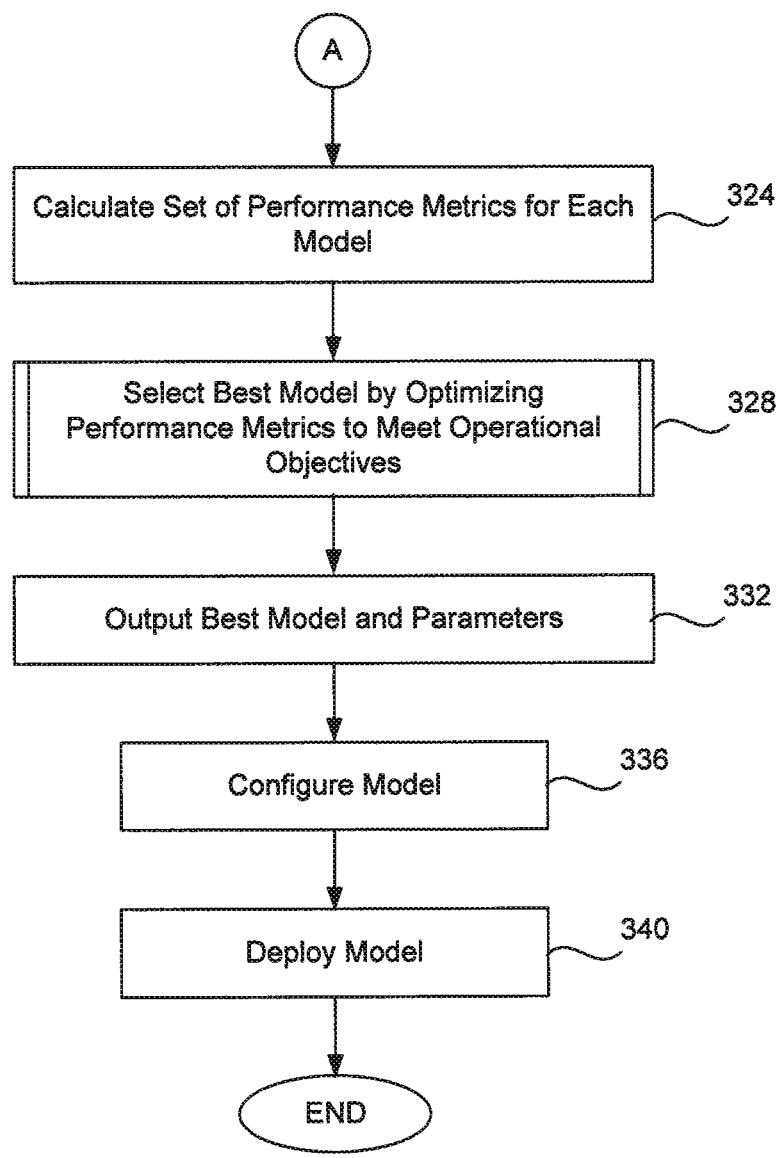

FIGS. 4A and 4B are a flow diagram describing automatic model training and selection according to one embodiment. This process may be performed daily, weekly or on demand. Typically, the process will be performed for each model currently used in production (e.g., models 160-168) although need not be performed for each model every time. And, should an issue arise with a particular model or block of segmented transaction data (such as an increase in fraud in a particular channel, too many False Positives produced by a particular model, a desire to decrease the Review Rate for a particular block of transactions, etc.) then the model associated with that block may be subject to this process. In addition, should a performance objective change regarding a particular model or block of segmented transaction data (or for a particular client or for all clients) then the relevant models will also be subject to this process. For example, should client XYZ decide that the cost of processing its transactions is too high and it is desired to reduce the labor rate associated with manual review, then this process may be used with respect to model E and its associated segmented transaction data using a Review Rate value that is lower. Use of a performance objective to drive how to select a best model is discussed in more detail below in step 328.

As mentioned, transaction data 60 exists on a production server and typically includes one record per transaction. At some point in time, it may be known that a certain historical transaction was fraudulent. Once determined to be fraudulent, a binary flag is set for that particular transaction to assist with model training. Thus, in step 304, any transactions known to be fraudulent are flagged within the transaction data.

In step 308 the model data is created from the segmented transaction data used by a particular production model. As previously mentioned, each transaction record containing the raw transaction data is augmented with any number of predictive variables and their values, such as approximately 2,000 variables. Any previous time period may be used from which to gather the transaction data from which the model data is created. In one embodiment, a previous time period of about three months to six months is suitable for creating model data from transaction data. Preferably, the previous time period extends from the current time and date when the model data is created (or a practical equivalent such as the morning of the current day or the day before) to a previous date such as three to six months ago as mentioned. By including data up until the current date, the candidate models will be trained, validated and tested using the most current transaction data that best reflects any recent fraud patterns. In addition, because the current production model to be replaced was necessarily trained and selected at a previous time using older transaction data, the best model that is eventually selected will necessarily be trained with the most current transaction data and will be better able to handle the current fraud environment. Of course, it is also possible to create model data based upon a window of transaction data in the past, such as transaction data spanning the time period from six months ago up until three months ago; using such a window of data from the past can be useful because most of the fraudulent transactions from that period will have been reported.

And, model data will be created from segmented transaction data relevant to the model in question. For example, should the process of FIG. 4 be initiated because of a concern with model C (or rather, because of a concern with non-Web channel transaction data for a particular client), then the model data will be created only using transaction data for that particular client that is not from a Web channel Typically, it is expected that each model in turn will be subject to the analysis of FIG. 4, and thus each pass through FIG. 4 will create model data using a particular segment of the transaction data, for example, using a segment shown in FIG. 2. Thus, a new best model may be periodically trained, selected and deployed for each model currently used in production.

As mentioned earlier, the present invention is able to rapidly train and select an appropriate model or models on a periodic basis, such as daily or weekly. Accordingly, step 308 may be executed at least daily or on demand, thus beginning a process that ends at step 340. Once created, the model data may be stored in place on a production server within transaction data 60 or stored upon a separate server.

In step 312 the multiple model engine 220 automatically retrieves the model data from its database to begin the training process. In step 316 the fraud variable (i.e., the binary flag in each transaction) is set to be the target variable of each model to be trained. In other words, each model is instructed that the target will be the fraud variable. As mentioned, many models will be trained at the same time and then compared, and these models may include any of the models mentioned above among others.

In step 320 each model is trained, validated and tested using the target and the model data. Training, validating and testing a model using model data is known in the art and typically includes partitioning the model data into data used for training, data used for validating and data used for testing. The result from step 320 for each model is output data.

Once the multiple models have been trained, they will then be automatically compared and selected in order to choose the best model for the current environment. Step 324 calculates a set of performance metrics for each model. There are a wide variety of performance metrics that may be calculated including the metrics of Sensitivity, False Positives and manual Review Rate. Depending upon the specific operational objectives of enterprise 20 and of a particular client (which generally include detecting fraud at a low false positive rate with minimum labor costs) the three metrics listed above may be used, or others may also be included. Other possible metrics include Lift, Specificity, False Negative rate, ROC curve and others. The three metrics listed above are calculated for each model using the output data from step 320.

And, each time the loop of FIG. 4 is executed (i.e., on a daily or weekly basis) other performance metrics may be chosen as a basis for selecting the best model. Values for these calculated performance metrics for a particular model may be stored in a table and can also be represented in graphical form as described below.

Next, in step 328 the best model is selected based upon these calculated performance metrics in view of the operational objectives of the enterprise and the client. In this specific example, the three metrics of Sensitivity, False Positives and manual Review Rate are not independent; choosing a value for one of these metrics for a particular model necessarily dictates a value for each of the other two metrics. Choosing a value for one of these metrics thus dictates how a model will perform in terms of Sensitivity, False Positives and Review Rate. And, each performance metric for a particular model is not necessarily a single value, but rather a range of values, one of which may be selected in order to dictate how the model performs.

Figure 5:
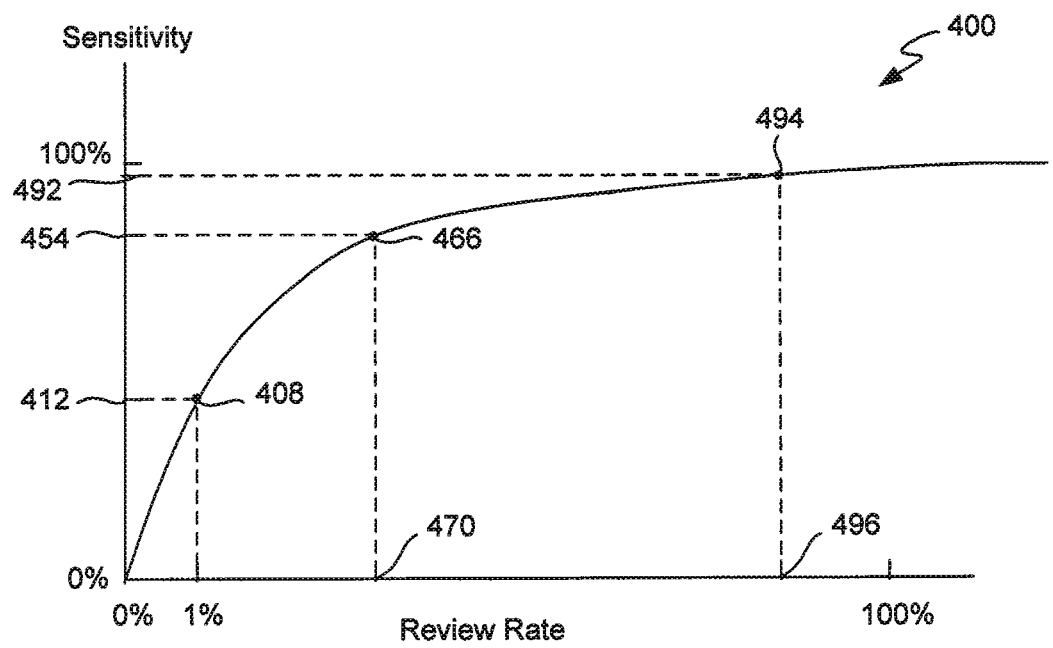
FIG. 5 is a graph of Review Rate versus Sensitivity.
Figure 6:
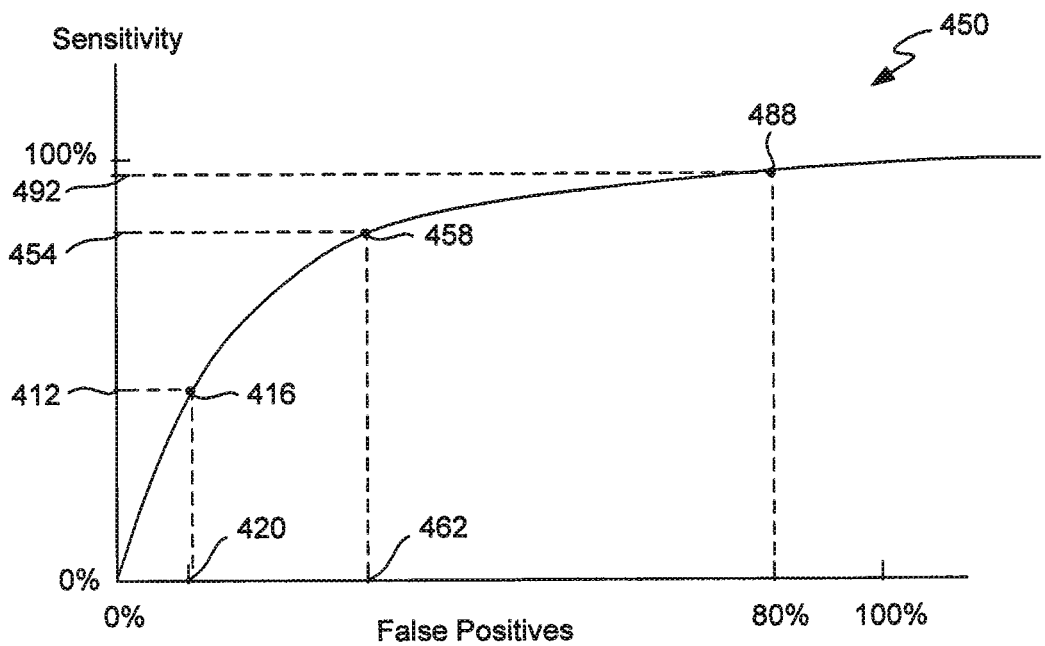
FIG. 6 is a graph of False Positives versus Sensitivity.

FIGS. 5 and 6 are graphs illustrating how the performance metrics for a model A are interdependent. FIG. 5 is a graph of Review Rate versus Sensitivity and FIG. 6 is a graph of False Positives versus Sensitivity. As shown, as the Review Rate or the False Positives increase, so does Sensitivity. In a first example, consider operational objectives that dictate that the highest priority performance metric is a Review Rate of 1%. As shown in FIG. 5, this yields point 408 on the graph which dictates that the Sensitivity for this model will be a particular value 412. Therefore, FIG. 6 shows that a Sensitivity of 412 yields point 416 on the graph which dictates that the False Positives for this model will be a particular value 420. In a second example, consider operational objectives that dictate that the Sensitivity should be a value 454 as shown in FIG. 6. This value yields point 458 on the graph which dictates that the False Positives for this model will be a particular value 462. Therefore, FIG. 5 shows that a Sensitivity of 454 yields point 466 on the graph which dictates that the Review Rate for this model will be a particular value 470. In the third example, consider operational objectives that dictate that the False Positives should be 80%. As shown in FIG. 6, this yields point 488 on the graph which dictates that the Sensitivity for this model will be a particular value 492. Therefore, FIG. 5 shows that a Sensitivity of 492 yields point 494 the graph which dictates that the Review Rate for this model will be a particular value 496.

This example shows how certain performance metrics are dependent upon one another and how choosing a particular value for one performance metric not only adjusts how the model will behave for that particular performance metric, but also dictates values for the other performance metrics. Of course, other performance metrics may be used and any of the performance metrics may be considered the highest priority and may be a starting point for this analysis and selection of the best model. FIGS. 5 and 6 only show performance metrics data and curves for a single model; each model will have different data and curves using the same performance metrics. Further, the graphs are for ease of explanation; typically the performance metric data shown will be represented within tables. And, there may be more or a fewer number of graphs depending upon the number of performance metrics used.

As mentioned, one may choose a value for the highest priority metric and then evaluate the other metrics values as well. In general, the operational objectives of processor 20 (also taking into account the desires of a particular client) will drive which of the performance metrics is considered a higher priority. For example, if the primary objective is to lower labor costs or to improve the customer experience, then lowering the Review Rate may be the highest priority. Or, if fraud is increasing and it is important to detect more fraud, then raising the Sensitivity will be the highest priority. On the other hand, if too many legitimate customers are having their cards declined, then lowering False Positives will be the highest priority. Therefore, once the primary objective is identified, the specific performance metric is selected to help achieve that objective and a particular value for that performance metric is determined based upon experience, client input, and history.

It is important to note that the primary objective can change daily or weekly, can be different for different clients, can be different for different segmented blocks, and thus different for different models. The present invention thus provides a great deal of flexibility not only in optimizing models for different segments, clients and types of fraud, but also in changing those models on demand when necessary.

Step 328, therefore, may be performed in different manners. In a first embodiment, this step is performed manually by an individual who is able to review the graphs showing the relationships between the performance metrics of each model, such as the graphs of FIGS. 5 and 6 for a particular model A. After reviewing the graphs for each model, the individual may choose a performance metric with the highest priority (e.g., "the Review Rate may not be higher than 1%"), determine the other performance metrics dictated by that Review Rate for each model, and then compare the other metrics for each model. For example, the individual may simply choose the model that has the highest Sensitivity for that Review Rate of 1%. Or, the individual may choose the model that has the best combination of Sensitivity and False Positives for that Review Rate. In addition to viewing graphs, the data for performance metrics for each model may be output in the form of tables which are reviewed by the individual.

In a second embodiment, step 328 is performed in an iterative fashion automatically by a computer. In this embodiment, the computer iterates over a range of desired values for the highest priority performance metric and calculates values for the other performance metrics on each iteration. For example, if a value of 1% for the Review Rate is the highest priority, then the range of desired values may be from 0.5% to 1.5% in increments of 0.1%. Starting at the low range, the computer calculates the corresponding Sensitivity and False Positives for that Review Rate and a determination is made as to whether both the Sensitivity and False Positives are acceptable. If not, then the iteration continues to the next value. If so, then the current Review Rate value along with the corresponding Sensitivity and False Positives are output as the best performance metrics possible using that model. This iteration is then performed for all other models under consideration. Once finished, the computer may choose the model having the best Review Rate (i.e., the lowest), may choose the model with the highest Sensitivity (if Sensitivity is most important as long as the Review Rate is within the desired range), or may choose the model having the lowest False Positives. In an alternative to this embodiment, iteration occurs over the entire range of values without stopping and all values for performance metrics are stored in a table which may then be compared to one another. Of course, other techniques for choosing the best model based upon the data output in this embodiment are also possible such as by using an ROC curve along with other data. And, the highest priority performance metric may be other than the Review Rate and may have a minimum or maximum, rather than a desired range.

Figure 7:
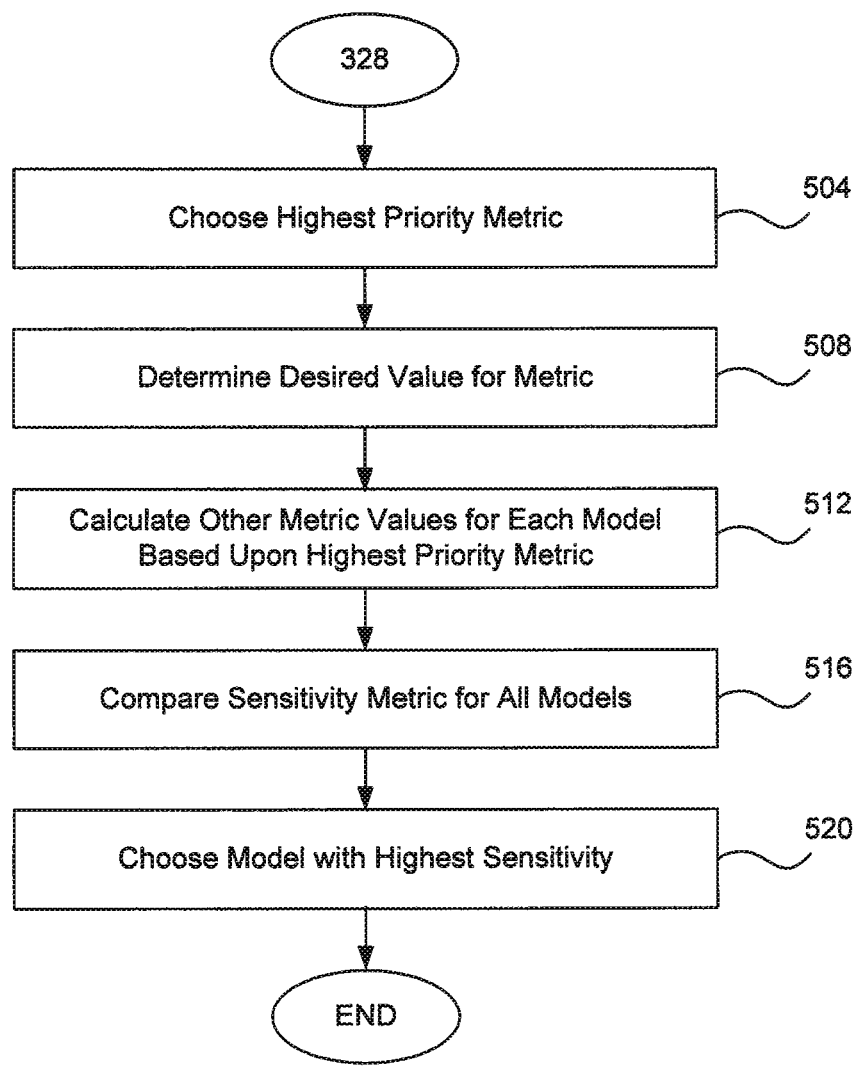
FIG. 7 is a flow diagram describing yet a third embodiment of how step 328 may be performed.

FIG. 7 is a flow diagram describing yet a third embodiment of how step 328 may be performed. In this embodiment, only a single value is chosen for the highest priority performance metric which then dictates the values for the other performance metrics. In a first step 504 the highest priority performance metric (such as Sensitivity, Review Rate, False Positives, or other performance metric) is chosen based upon the operational objectives of the processor and client. For example, if the operational objective is to enhance the customer experience then the metric "Review Rate" may be chosen. In step 508 a desired value for the chosen metric is determined such as, for example, 1%. In step 512 the other values for the other performance metrics are calculated for each model based upon this desired value for the highest priority metric. For example, as shown in FIGS. 5 and 6 for a particular model, once a Review Rate of 1% has been determined, then the values for Sensitivity and False Positives are dictated for that particular model.

Next, in step 516 one or more of the other performance metrics may be compared in order to determine which model is best. Typically, the performance metric of Sensitivity is an important metric and is used to compare models. Thus, in this step, the metric of Sensitivity is compared for all models. Of course, other metrics may be compared or, a combination of metrics for each model may be compared. Finally, in step 520 the computer chooses the model having the highest Sensitivity (or other performance metric used for comparison). In an embodiment where False Positives have been a problem for the processor or client, the model with the lowest False Positives may be chosen.

Once the best model has been chosen, then in step 332 this model is output along with its parameters. Outputting the model may be performed in different manners, such as by simply identifying which model has been chosen, by outputting a name or description of the model on the screen or on paper, by modifying a database or software programmed indicating that a new best model has been chosen. Along with the model, its various parameters are output such as any performance metrics and their values determined in the selection step 328, and a variety of other parameters such as weightings and coefficients.

Next, in step 336 the selected model is configured for deployment in a production environment. In this step the model score threshold is set based upon the chosen value of the highest priority performance metric. For example, if the highest priority metric was Review Rate and its chosen value was 1%, then this value is translated into a score threshold for that model that best helps to achieve that particular Review Rate.

Finally, in step 340 the new model with its parameters and score threshold is deployed in a production environment to replace the model that was subject to this process. For example, if the process of FIG. 4 was directed at model D (i.e., the segmented model data was created from high dollar value transactions for a particular client) then the new model will replace model D in the production environment. Of course, it is possible that the process will choose the same modeling technology as the one already in use (i.e., the model data is based upon a block of transaction data processed by model B which uses the random forest algorithm, and the random forest algorithm is again selected as the best model); if this occurs, the current model will still be replaced because the new model will have different parameters.

As mentioned earlier in step 308, it is preferable that the model data is based upon previous transaction data that stretches from the current date to a previous date. Thus, the new best model will necessarily be based upon new transaction data that was not used to train and select the current model in production. Therefore, the new model will replace the current model because it will be better able to handle transactions given the current fraud environment. As mentioned earlier, this process may be repeated using different blocks of segmented transaction data so that each model in production may be subject to replacement.

Example Implementation

Figure 8:
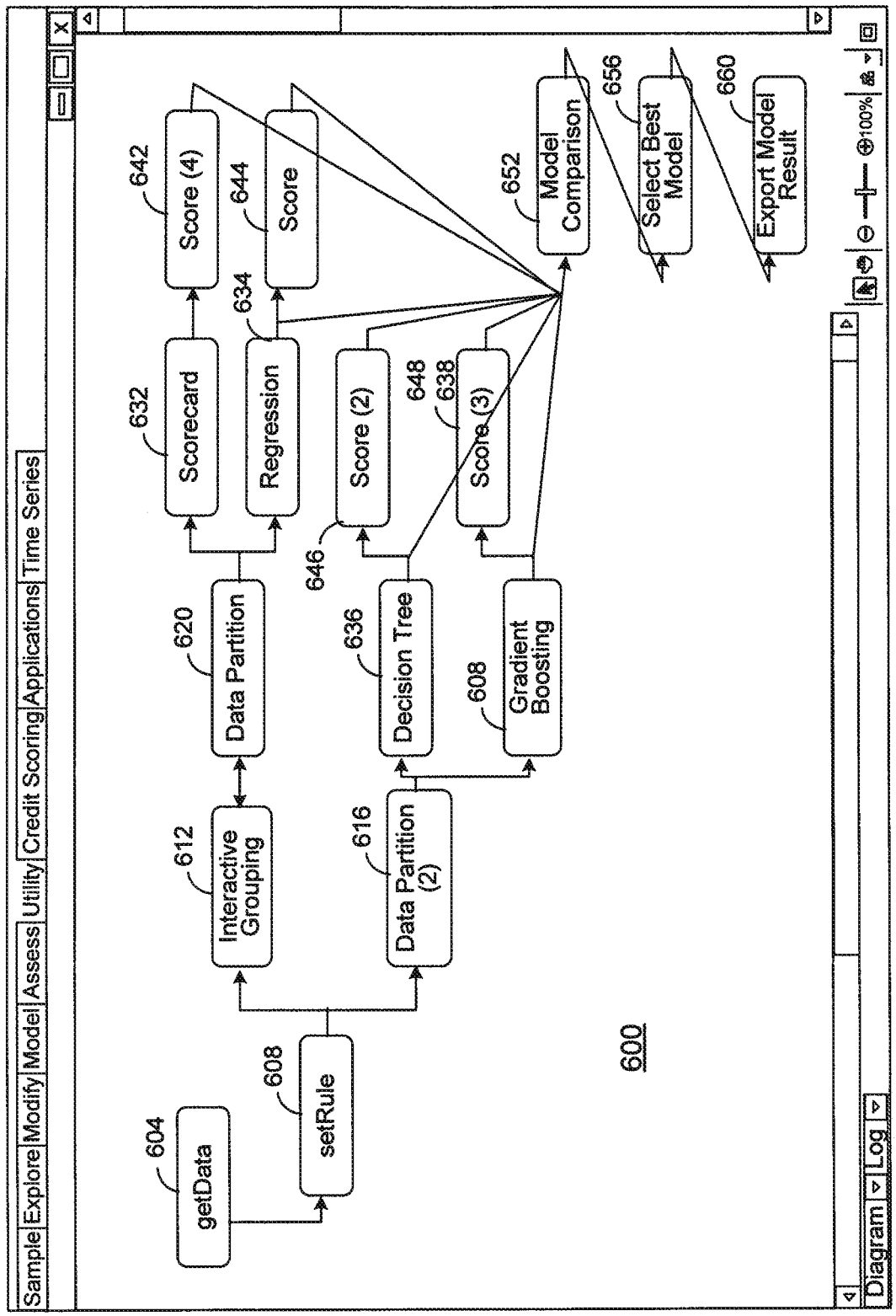
FIG. 8 illustrates an example implementation of the present invention using a specific software application.

FIG. 8 illustrates an example implementation of the present invention using a specific software application. As mentioned previously, one advantage of the present invention is the ability to periodically and automatically, train and select the best model to replace a model currently in production for a particular block of segmented transaction data. Any of a variety of software modeling platforms may be used to implement the present invention. In this specific embodiment, the software application "Enterprise Miner" and "Enterprise Guide" available from SAS is used to automate the present invention.

Shown at 600 is a window from this software application that illustrates graphically blocks of functionality that will execute in order to train and select the best model. Blocks 604 and 608 correspond to steps 308-316. Blocks 612-648 correspond to steps 320 and 324. Of these blocks, blocks 632-638 represent numerous types of models that are trained, validated and tested; as mentioned earlier, other model types may also be used.

Blocks 642-648 represent the performance metrics for each model. Blocks 652 and 656 represent step 328, and block 660 represents step 332. Advantageously, this modeling platform may be used on a daily or on-demand basis in order to refresh each model that is currently used in the online production system, thus providing the best models at the time to handle the current fraud environment.

Computer System Embodiment

Figure 9A:
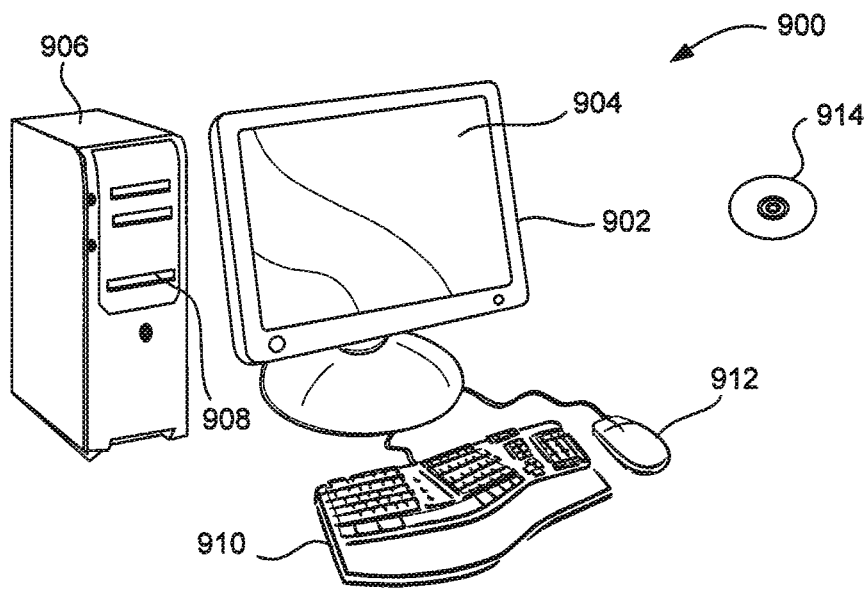
FIGS. 9A and 9B illustrate a computer system suitable for implementing embodiments of the present invention.
Figure 9B:
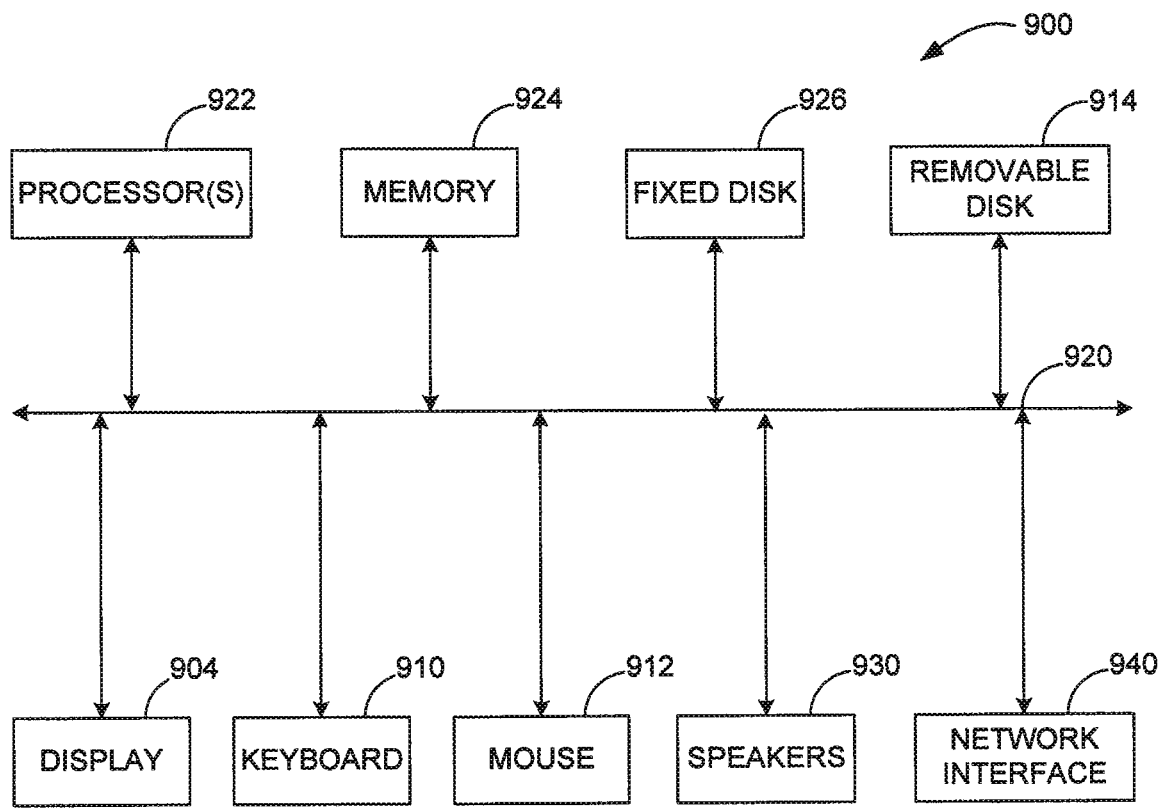

FIGS. 9A and 9B illustrate a computer system 900 suitable for implementing embodiments of the present invention. FIG. 9A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 9B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of processing payment transactions in a payment processing system, said method comprising:

receiving, in said payment processing system, a continuous flow of payment transactions from a plurality of computing devices and storing said payment transactions as historical payment transactions in a database of said payment processing system;

creating model transaction data using a segment of said historical payment transactions that have been segmented using payment transaction criteria, wherein each payment transaction of said segment of historical payment transactions is indicated as being fraudulent or not;

training a plurality of fraud detection models using said model transaction data, each of the fraud detection models being trained to learn when each payment transaction of said segment of historical payment transactions is fraudulent or not;

for each of said fraud detection models, calculating a plurality of performance metrics based upon output data from said training of said each fraud detection model, wherein each of said calculated performance metrics is specific to said each fraud detection model;

choosing a value for a first one of said performance metrics, wherein said first performance metric is one of sensitivity, false positives, review rate, lift, specificity, false negative rate, or receiver operating characteristics (ROC) curve;

selecting one of said fraud detection models based upon a value of another of said performance metrics of said fraud detection models that is dependent upon said chosen value of said first performance metric, wherein said calculated performance metrics of said selected fraud detection model include said chosen value of said first performance metric and said value of another of said performance metrics;

replacing an existing fraud detection model that is currently processing payment transactions satisfying said payment transaction criteria in said payment processing system with said selected fraud detection model; and processing or denying a payment transaction received from a computing device and satisfying said payment transaction criteria using said selected fraud detection model and displaying a result of said processing or denying on said computing device.

2. A method as recited in claim 1 further comprising:
continuing to process payment transactions satisfying said payment transaction criteria using said selected fraud detection model.

3. A method as recited in claim 1 wherein said segment of historical transactions extends from a current date when said method is executed back to a previous date.

4. A method as recited in claim 1 further comprising:
translating said value of said first performance metric into a score threshold for said selected fraud detection model.

5. A method as recited in claim 1, further comprising:
not delivering digital goods or services associated with said payment transaction from a merchant to said individual when said payment transaction is denied.

6. A method as recited in claim 1, further comprising:
delivering digital goods or services associated with said payment transaction from a merchant to said individual when said payment transaction is processed.

7. A method as recited in claim 1, further comprising:
receiving an operational objective for said payment transactions satisfying said payment transaction criteria currently being processed by said existing fraud detection model; and
translating said operational objective into said value for said first performance metric.

8. A method as recited in claim 1, wherein said step of choosing a value for a first one of said performance metrics further comprises:
iterating over a range of values for said first performance metric,
calculating a potential value for said another performance metric upon each iteration, and
choosing said value for said first performance metric when said potential value reaches a predetermined value.

* * * * *